US011927054B2

(12) United States Patent
Tannoury et al.

(10) Patent No.: US 11,927,054 B2
(45) Date of Patent: Mar. 12, 2024

(54) ISOLATING DISPENSER APPARATUS

(71) Applicant: Tony Tannoury, Andover, MA (US)

(72) Inventors: Mark Tannoury, Andover, MA (US); Tony Tannoury, Andover, MA (US); Tamara Tannoury, Andover, MA (US); Jasmine Tannoury, Andover, MA (US)

(*) Notice: Subject to any disclaimer, the term of this patent is extended or adjusted under 35 U.S.C. 154(b) by 293 days.

(21) Appl. No.: 17/477,633

(22) Filed: Sep. 17, 2021

(65) Prior Publication Data

US 2022/0098927 A1 Mar. 31, 2022

Related U.S. Application Data

(60) Provisional application No. 63/079,574, filed on Sep. 17, 2020.

(51) Int. Cl.
*E06B 7/32* (2006.01)
*A47G 29/22* (2006.01)

(52) U.S. Cl.
CPC ................ *E06B 7/32* (2013.01); *A47G 29/22* (2013.01)

(58) Field of Classification Search
CPC .. E06B 7/32; E06B 3/90; A47G 29/22; A47G 29/28; E05G 7/00; E05G 7/007
USPC ...................... 232/43.1, 19, 43.4; 109/19, 68
See application file for complete search history.

(56) References Cited

U.S. PATENT DOCUMENTS

| | | | | |
|---|---|---|---|---|
| 1,669,539 A * | 5/1928 | Smart | E05G 7/007 | 109/19 |
| 1,669,540 A * | 5/1928 | Smart | E05G 7/007 | 109/19 |
| 1,673,601 A * | 6/1928 | Edwin | E05G 7/007 | 109/19 |
| 1,804,776 A * | 5/1931 | James | E05G 7/007 | 109/19 |
| 1,924,330 A * | 8/1933 | Scheeler | E05G 7/007 | 109/19 |
| 3,702,101 A * | 11/1972 | Moore | E05G 7/007 | 109/19 |
| 4,084,518 A * | 4/1978 | Carlson | E06B 7/32 | 109/19 |
| 4,157,071 A * | 6/1979 | King | A47G 29/14 | 109/19 |
| 4,351,247 A * | 9/1982 | Clark | E06B 7/32 | 109/19 |
| 4,523,527 A * | 6/1985 | Bourlier | E05G 7/007 | 109/19 |
| 6,748,879 B2 * | 6/2004 | Ehrmann | G07F 11/54 | 109/19 |
| 7,246,562 B2 * | 7/2007 | Lee | E06B 7/32 | 109/19 |

(Continued)

*Primary Examiner* — William L Miller
(74) *Attorney, Agent, or Firm* — Rimon PC; Marc S. Kaufman

(57) ABSTRACT

A dispenser is mounted in an aperture formed in a partition to dispense goods from a first party on one side of the partition to a second party on the other side of the partition. Multiple trays are disposed on a rotating mechanism to move a selected tray from a position near the first party, such as an employee at a food service, and a second party, such as the customer. Subsequently, the tray can be moved linearly outward toward the second party to thereby position goods within reach of the second party without the need for close proximity or contact between the parties.

9 Claims, 6 Drawing Sheets

(56) References Cited

U.S. PATENT DOCUMENTS

| | | | | |
|---|---|---|---|---|
| 10,697,237 | B1 * | 6/2020 | Carpenter | E06B 7/32 |
| 11,369,223 | B2 * | 6/2022 | Plummer | A47G 29/141 |
| 2003/0029695 | A1 * | 2/2003 | Ehrmann | G07F 11/54 198/348 |
| 2006/0289271 | A1 * | 12/2006 | Nelson | F24B 1/199 198/347.1 |
| 2023/0044060 | A1 * | 2/2023 | Carr | B64C 39/024 |

* cited by examiner

ISOLATING DISPENSER APPARATUS

BACKGROUND

Various apparatus for facilitating through-the-wall transactions, such as the exchange of goods between an employee of a business establishment inside an enclosure and a customer outside the enclosure, are well known. For example, the anachronistic "auto teller" at a bank includes a drawer that slides from a portion on one side of the wall to a position on the other side of the wall to allow documents, such as checks and currency, to be passed between a bank teller and a bank customer in a secure manner. Further various turntable devices are also well known. U.S. Pat. No. 4,069,773 discloses a pass-through device to be used in, for example, a food service drive through window, which includes a horizontal axle for allowing a tray to rotate from a position inside of the wall to a position accessible from the outside of the wall. U.S. Pat. No. 4,351,247 discloses a similar turntable device in which a rotatable shelf extends outward towards the customer beyond the frontal surface of the housing of the passthrough to make it easier for a customer to reach items on the shelf when the shelf is rotated outward.

Such prior art devices have facilitated new business models, such as drive through purchases. However, the prior art has many limitations. For example, in the case of a drive through, the customer must often reach far out of the vehicle to retrieve the goods. The employee often has to lean forward outside the window, in an attempt to meet the customer "halfway." Mirrors and the like on vehicles make it impossible for even a very skilled driver to maneuver close to the tray. Further payment mechanisms are not incorporated into the device. The customer must put currency, credit cards or the like into the drawer onto the tray to make payment. Therefore, the exchange of goods and payments is often awkward with the customer having to reach with one hand or lean fully out of the vehicle window. This results in poor and unsafe handling of the goods. Often, this process will necessitate multiple exchanges. Further, most of current windows or countertops require an open channel between the employee and the customer and thus pose a safety risk, the exposure to violence or pathogens for example, to the employee in addition to heat/cold loss during extreme weather.

BRIEF SUMMARY

The disclosed implementations overcome the above-identified disadvantages of the prior art. Multiple trays are disposed on a rotating mechanism to move a selected tray from a position near the first party, such as an employee at a food service, and a second party, such as the customer. Subsequently, the tray can be moved linearly outward toward the second party to thereby position goods within reach of the second party without the need for close proximity or contact between the parties. Disclosed implementations include, a dispenser apparatus adapted to be disposed in an opening of a divider to permit goods to be dispensed from a first party on a first side of the divider, such as an internal or external wall, to a second party on a second side of the divider, the apparatus comprising: a housing adapted to be mechanically coupled to the divider to thereby secure the housing in the opening, the housing having a first aperture formed in a portion thereof that extends to the first side of the divider when the housing is disposed in the opening and a second aperture formed in a portion thereof that extends to the second side of the divider when the housing is disposed in the opening; a base rotationally mounted in the housing to thereby be rotatable with respect to a longitudinal axis of the housing; a plurality of trays slidably mounted on the base, each of the trays being movable from a retracted position relatively close to the center of the base, to an extended position relatively far from the center of the base, wherein the base can be rotated to position selected ones of the trays in opposition to the first aperture or the second aperture to thereby allow the first party to selectively have access to the trays through the first aperture and the second party to selectively have access to the trays through the second aperture; and a control mechanism coupled to the trays to thereby allow the first party to rotate the base and selectively move a selected one of the trays to a position in opposition to the second aperture and to move the selected one of the trays from the retracted position, to the extended position to thereby move the tray through the second aperture towards the second party.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings.

DETAILED DESCRIPTION

Figure 1:
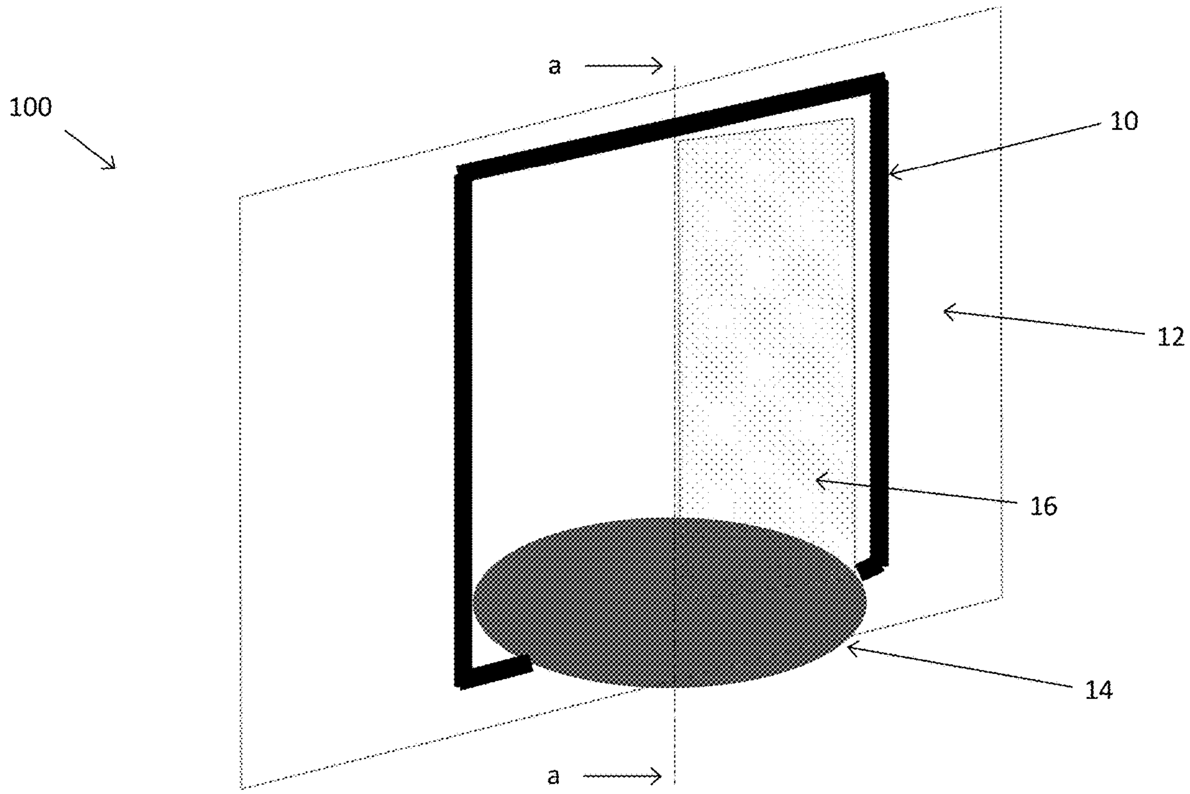
FIG. 1 is a schematic illustration of a dispenser apparatus in accordance with a disclosed implementation.

Certain terminology is used in the following description for convenience only and is not limiting. The words "bottom," "top," "lower" and "upper" designate directions in the drawings to which reference is made. Unless specifically set forth herein, the terms "a," "an" and "the" are not limited to one element but instead should be read as meaning "at least one." The terminology includes the words noted above, derivatives thereof and words of similar import.

The disclosed implementations include a rotatable, circular design with multiple tray elements separated by dividers and laterally extending mechanisms that transport the goods and/or payment mechanism much closer to the customer secure manner. The disclosed implementations allow the tray elements to be easily maneuvered to a position that is much closer to the customer. Further, the implementations can provide a portioned and touchless experience. Payment can be made from outside of the apparatus without exchanging credit cards or currency between parties. The disclosed implementations also permit the loading of goods by the employee in a very organized and accurate manner on the store side.

Recently, the Covid 19 pandemic has presented a significant health hazard to people that are in close proximity to one another. The disclosed implementations thus reduce the spread of disease. Further, the pandemic has caused many customers to use drive through pick up for food and other goods, rather than in store eating, purchase or even pick up. Because of this new customer preference, drive through lanes will be much busier, the wait will become much longer, and vendors will risk losing customers who are not willing to wait. The disclosed implementations permit simultaneous exchange of goods and payment and thus can speed up significantly the process per customer.

Disclosed implementations provide marketing and other information exchange opportunities to vendors. The tray elements can be divided by "smart dividers" that allow digital messaging. This will make the window experience more interesting and informative to the customer. For example, if the customer buys a hamburger at the window a confirmation message, such as a picture of the ordered food, can be provided to reduce errors. Also, complementary products, such as side dishes, or discounts can be suggested. Additionally, various components can be made of bullet proof material for use inside stores with high exposure risk to armed robberies. There will always be a protecting shield between the store employee and any person on the other side of the revolving dispenser. The implementations also save energy by reducing any convection between the employee and the customer.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

FIG. 1 illustrates an example of the basic elements of dispenser apparatus 100 in accordance with a disclosed implementation. Housing 10, in the form of a frame in this example, is disposed in an opening of divider 12. For example, divider 12 can be the wall of a structure or any other partition between two areas. Base 14 is rotationally mounted in housing 10 to be rotatable about axis a-a. As an example, base 14 can be fixed mounted on an axle/shaft extending along axis a-a and the axle/shaft can be supported at each end by rotatable bearings. As discussed below, base 14 is adapted to support multiple tray elements. Multiple partitions 16 are coupled to base 14 in the manner described below to separate the tray elements. Only one partition 16 is shown in FIG. 1 to avoid obscuring other components. The housing can be cylindrical, cubical, or in any other appropriate form with various openings to accommodate access to the trays in the manner described below. While base 14 is illustrated as being in the shape of a disk in FIG. 1, it will be apparent to one of skill in the art that the base can take any appropriate shape.

Figure 2:
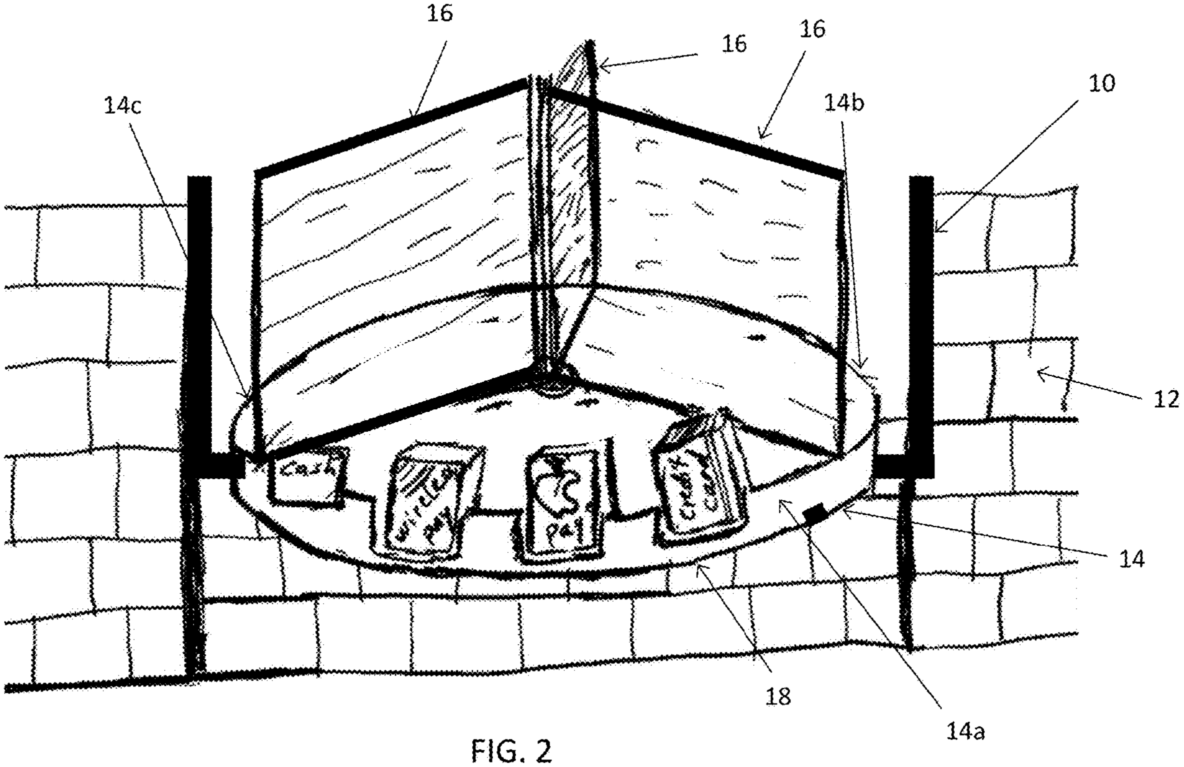
FIG. 2 is a partial perspective view in accordance with a disclosed implementation.

FIG. 2 illustrates the trays of a disclosed implementation in more detail. Three partitions 16 define three trays 14*a*, 14*b*, and 14*c* on base 14. There are three partitions 16 and three trays 14*a*, 14*b*, and 14*c* in this example. However, there can be any number of partitions defining any number of trays as desired. The trays can have various protrusions and or recesses (collectively labeled as 18) formed thereon to define holding elements for various products and/or payment mechanisms (a card reader for example).

Figure 3A:
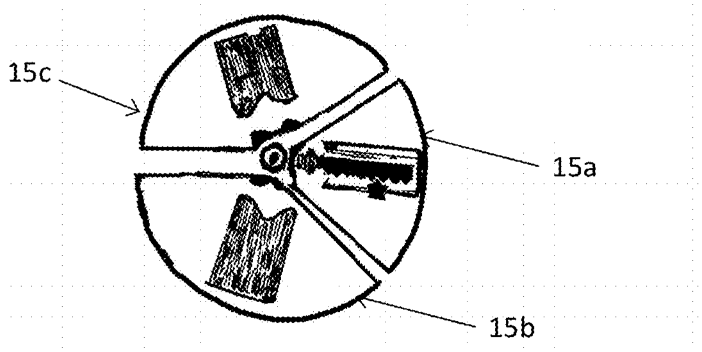
FIGS. 3*a* and 3*b* are bottom views of the tray element configuration in accordance with a disclosed implementation.
Figure 3B:
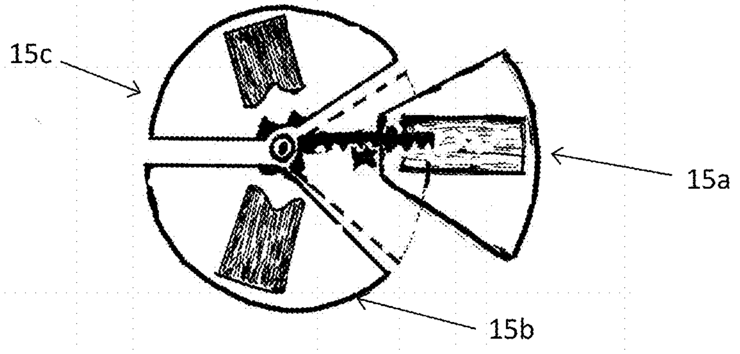

FIG. 3*a* is a top view of trays 14*a*, 14*b*, and 14*c* which can be defined respectively by tray elements 15*a*, 15*b*, and 15*c* which are slidably mounted on base 18 in accordance with a disclosed implementation. In FIG. 3*a* all tray elements 15*a*, 15*b*, and 15*c* are disposed in a retracted position. FIG. 3*b* is a top view of tray elements 15*a*, 15*b*, and 15*c* showing tray element 15*a* in an extended position, moved laterally outward to be remote from a central portion of base 14 in this example. The tray elements are each slidably mounted on base 18 through any known mechanism such as guides, slots, bearings, rollers and/or other known mechanical elements. It would be rudimentary to one of skill in the mechanical arts to slidably mount the tray elements on base 18.

Figure 4A:
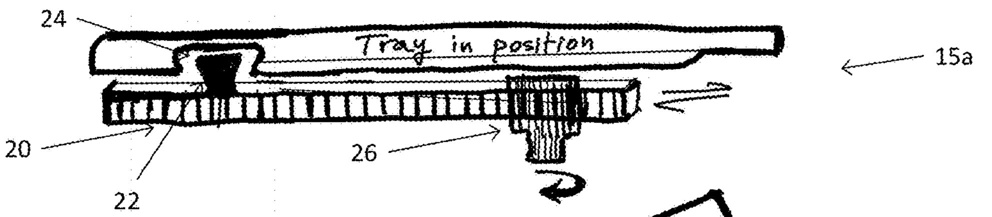
FIGS. 4*a* and 4*b* respectively are a side view and a bottom view of a lateral extension mechanism in accordance with a disclosed implementation.
Figure 4B:
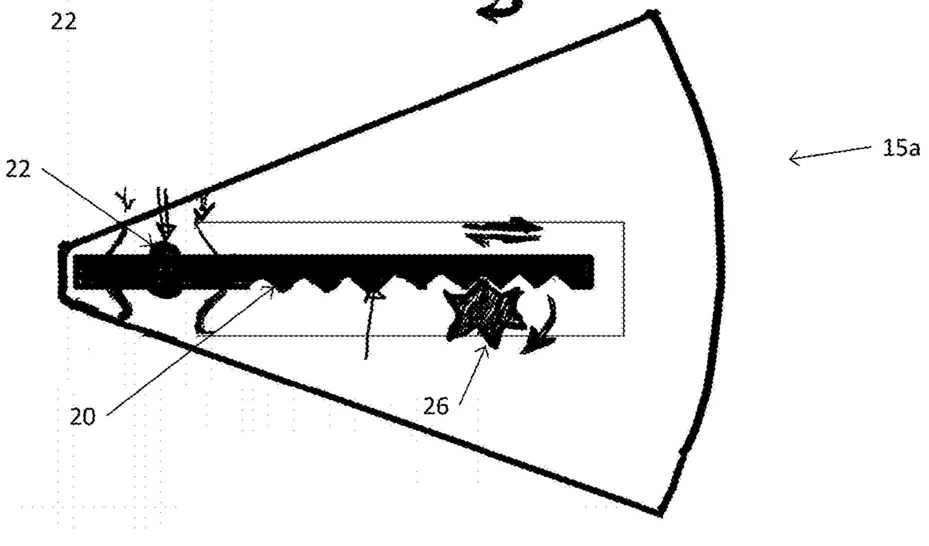

As shown in more detail in FIG. 4*a* (which as a side view of tray element 15*a*) and FIG. 4*b* (which is a bottom view of tray element 15*a*) tray element 15*a* is coupled to rack element 20 by knob 22 formed on rack element 20 and extending into recess 24 formed in tray element 15*a*. Of course, this connection can be made in any appropriate manner, which would be readily ascertainable by one of skill in the art. Pinion element 26 is rotatably mounted on base 18 and can be coupled to a motor or other source of rotational force through appropriate linkages. Rotation of pinion element 26 causes rack element 20, and thus tray element 15*a*, to move linearly between the position shown in FIG. 3*a* and the position shown in FIG. 3*b*. As noted above, base 18 can be in the form of a disk or other flat element. Alternatively, base 18 can be one or more elongated elements extending radially from a hub. Tray elements 15*b* and 15*c* can have similar lateral movement mechanisms.

The source of rotational force can be controlled to allow the person on one or both sides of the partition to selective control the position of each tray element. Note that the partitions can be mounted on the base or on the tray elements. If the partitions are mounted on the tray elements, the partitions will move linearly with the tray elements to prevent object from falling off of the tray elements during movement.

Figure 5:
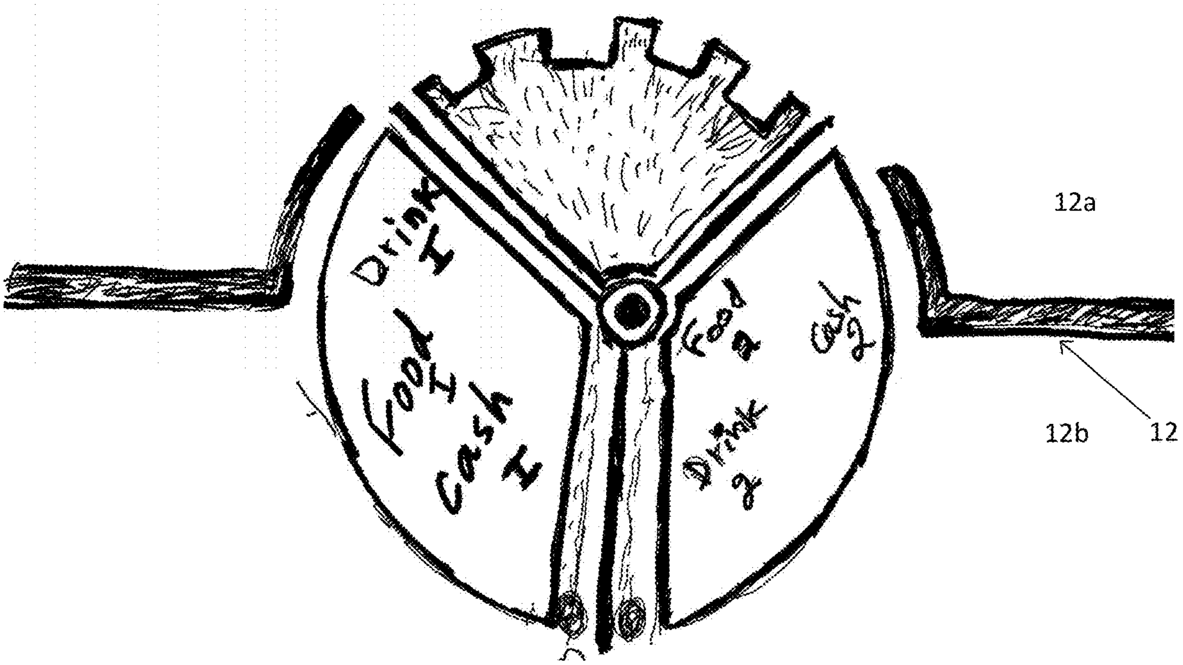
FIG. 5 is a top view of a dispenser apparatus in accordance with a disclosed implementation.

FIG. 5 illustrates a three tray example where the trays are configured differently for various purposes, such as payment, delivery of drinks and delivery of food or other goods. In the example of FIG. 5, partition 12 is configured to allow a customer on side 12*a* of wall 12 to access only a single tray at a time while the vendor on side 12*b* of wall 12 can access two trays at a time. The trays are augmented with sensors at the far edge of the tray that will automatically stop any movement when the tray is close to a hard surface: car window, mirror, person etc . . . .

The shape of the housing can be volumetric rather than flat. The geometry can be cylindrical, triangular, square, hex or any other appropriate shape based on the specific application. The trays can be of any size and/or proportions depending on the need. The trays can be defined by movable/modular elements to allow for ease of adjustment of tray sizes and the number of trays. One or more of the trays can be equipped with hardware for accommodating payment through commonly used payment methods; touchless credit cards, swiping credit cards, mobile device payments and/or cash. Trays or portions thereof can be designed to accommodate auxiliary items such as condiments, utensils, napkins, straws and the like.

One or more trays can be configured as a specialty tray that allows the employee to place the goods thereon in a fixed manner through the use of clamps recesses, and/or other elements. The dispenser can more than one tray disposed in a vertical manner. Upper trays can be adjustably positioned in a vertical direction. Upper trays can be moved and adjusted manually or through an automated and/or motorized mechanism.

The various parts can be made of metal, plastic, plexiglass, or the like to provide durability and protection (e.g. bullet proof characteristics). The partition can be configurable to provide different access between the customer side and the store side. For example, the partition configuration and/or position may be changed to give the loading tray more room if needed or to allow access to one or multiple trays from either side of the partition.

Rotational movement of base 14 and/or lateral movement of the tray elements 15*a*, . . . 15*n*, can be accomplished through manual mechanisms. For example, the operator can grasp the base and push it in a rotational manner for rotation and lateral movement can be accomplished by pushing/pulling on a member that is operatively attached to the tray elements.

Figure 6:
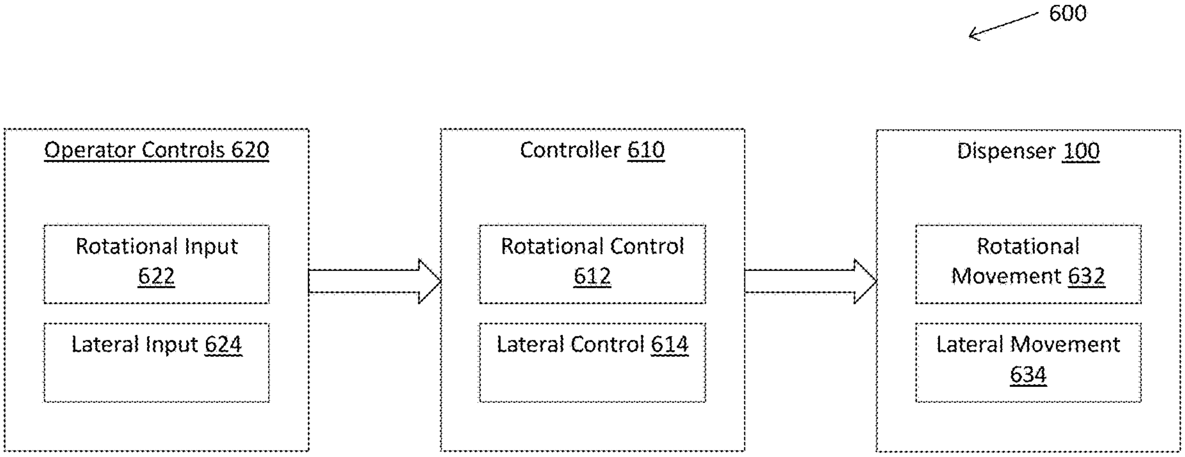
FIG. 6 is a schematic illustration of a movement control system in accordance with a disclosed implementation.

Further, as disclosed above, the rotational and/or lateral movement can be accomplished by automated control elements and actuators. As shown in FIG. 6, control system 600 can include controller 610, Operator controls 620 and movement elements of dispenser 100. Controller 610 can be digital or analog, receives input from operator controls 620, and outputs a control and/or power signal to dispenser 100. Operator controls 620 include rotational operator input devices 622 and lateral operator input devices 624 which can include buttons, switches, dials, slides and or, touchscreen components to allow the operator, such as a food service employee at a restaurant drive through window, to input commands to control the rotational movement and/or lateral movement of the tray elements. In response to receiving inputs from operator controls 620, controller 610 outputs the appropriate control and/or power signals to rotational movement mechanism 632 and/or lateral movement mechanism 634 of dispenser 100. For example, rotational movement mechanism 632 can include a motor coupled to the vertical axle noted above. Rotation of the vertical axle causes the tray elements to rotate in unison about axis a-a of FIG. 1. Lateral movement mechanism can include the above-noted motor, pinion gear and rack coupled to each tray element to cause lateral movement of tray elements independently as described above.

The disclosed implementations simplify the process of exchanging goods and payment, while providing isolation between the parties. In one example, there can be multiple dispensers that are utilized for delivery service pickup. Each dispenser can be unlocked with a remote touchless key that is distributed the delivery drivers. This feature will reduce the risk of lost or stolen items in addition to reducing traffic inside the store among other benefits.

What is claimed:

1. A dispenser apparatus adapted to be disposed in an opening of a divider to permit goods to be dispensed from a first party on a first side of the divider to a second party on a second side of the divider, the apparatus comprising:

a housing adapted to be mechanically coupled to the wall or divider to thereby secure the housing in the opening, the housing having a first aperture formed in a portion thereof that extends to the first side of the divider when the housing is disposed in the opening and a second aperture formed in a portion thereof that extends to the second side of the divider when the housing is disposed in the opening;

a base rotationally mounted in the housing to thereby be rotatable with respect to a longitudinal axis of the housing;

a plurality of moveable tray elements slidably mounted on the base, each of the tray elements being movable from a retracted position relatively close to the center of the base, to an extended position relatively far from the center of the base, wherein the base can be rotated to position a selected one or more of the moveable tray elements in opposition to the first aperture or the second aperture to thereby allow the first party to selectively have access to the selected one or more moveable tray elements through the first aperture and the second party to simultaneously have access to at least one other of the moveable tray elements through the second aperture;

a control mechanism coupled to the tray elements to thereby allow the first party to rotate the base and selectively move the selected one or more of the moveable tray elements to a position in opposition to the second aperture and to move the selected one or more of the movable tray elements from the retracted position, to the extended position.

2. The apparatus of claim 1, wherein the base includes a shaft extending longitudinally within the housing and a support element extending latitudinally from the shaft within the housing, and wherein each of the tray elements is slidably mounted on the support element.

3. The apparatus of claim 2, wherein the support element is a plate supporting the tray elements, and wherein each of the tray elements is slidably mounted on the plate.

4. The apparatus of claim 2, wherein the support element comprises a plurality of extension elements extending from the shaft, wherein each extension element supports a corresponding one of the tray elements and wherein each of the tray elements is slidably mounted on a respective one of the extension elements.

5. The apparatus of claim 2, further comprising a plurality of rack and pinion mechanisms, each rack and pinion mechanism being disposed between a corresponding tray element and the corresponding support element.

6. The apparatus of claim 1, wherein each of the tray elements comprises a base surface and at least one side surface extending upward from the base surface.

7. The apparatus of claim 6, further comprising an electronic display mounted on at least one of the side surfaces.

8. The apparatus of claim 1, further comprising a payment mechanism mounted on at least one of the tray elements.

9. The apparatus of claim 1, wherein the control mechanism comprises a manual mechanism coupled to the tray elements to thereby allow the first party to rotate the base and selectively move a selected one of the tray elements to the position in opposition to the second aperture and to move the selected one of the tray elements from the retracted position, to the extended position to thereby move the selected one of the tray elements through the second aperture.

* * * * *